Oct. 7, 1969　　　F. L. CALHOUN　　　3,471,012
EJECTOR MECHANISM AND CONTROL DEVICE
Filed Aug. 16 1967　　　5 Sheets-Sheet 1

Fig. 1

INVENTOR:
Fredrick L. Calhoun

ATTORNEYS

Oct. 7, 1969

F. L. CALHOUN 3,471,012

EJECTOR MECHANISM AND CONTROL DEVICE

Filed Aug. 16 1967

Oct. 7, 1969   F. L. CALHOUN   3,471,012
EJECTOR MECHANISM AND CONTROL DEVICE
Filed Aug. 16, 1967   5 Sheets-Sheet 5

INVENTOR:
Fredrick L. Calhoun
By Smyth, Roston & Pavitt
ATTORNEYS 3,471,012
EJECTOR MECHANISM AND CONTROL DEVICE
Fredrick L. Calhoun, Torrance, Calif., assignor to Industrial Dynamics Company, Ltd., Torrance, Calif., a corporation of California
Filed Aug. 16, 1967, Ser. No. 661,049
Int. Cl. B07c 5/342; B65g 47/52
U.S. Cl. 209—74                              31 Claims

ABSTRACT OF THE DISCLOSURE

Slats, with overlapping front plates are gradually guided across a conveyor line for displacement of objects such as bottles, thereon. The position of the bottles is detected and for each bottle one particular slat is selected to perform the ejection.

---

The present invention relates to a material handling apparatus and more particularly to a device for displacing individual objects in a controlled manner. Individual objects, such as containers, are often transported on a conveyor line or a conveyor belt, and such containers, all or a selected few thereof, are to be displaced from the conveyor line.

For example, the containers may have been washed or treated otherwise, and they are to be transported subsequently by such a conveyor line or belt to a filling station. The containers may differ in size, dimensions, embossed type labeling, or the like, and only particular ones are to be transported for particular processing such as a particular filling station, while others are to be used otherwise. Along the path of the conveyor line there may be positioned inspection stations to inspect the containers as to cleanliness or damage or other identifying characteristics. Only those containers which pass the respective inspection are to continue towards, e.g., the filling station, while the containers found to be deficient have to be sorted out. A similar problem exists as to containers leaving the filling station as they must be properly filled and/or properly closed. Those which are not have to be refilled or recapped.

Except for damaged containers, those sorted out are, of course, to be reused, for example, washed again, filled again, filled in a different station, etc. Thus, the removal of a container must be carried out with care as damage to the container should be avoided. This is particularly critical if the containers are glass bottles.

Significantly now, inspection stations of the various types have been developed recently, which permit the inspection of a container without requiring removal of such a container from the continuously running conveyor line. Inspection devices of this type are disclosed, e.g., in U.S. Letters Patent 3,225,191; 3,218,463; 3,061,666; and in my co-pending application S.N. 429,121, filed Aug. 12, 1952, now Patent No. 3,291,860; S.N. 387,287, filed Aug. 4, 1964, now Patent No. 3,349,906; and S.N. 544,445, filed Apr. 22, 1966.

Using inspection devices of this type eliminates, of course, the necessity of returning a container which has passed the inspection to the conveyor; instead it requires merely the removal from the conveyor line of only those containers which have been found to be deficient in any manner. The removal process must not interfere with the regular progression of the containers which are not deficient, while the removal process must permit the reusing of the eliminated containers. This is not an easy condition when the containers are glass bottles and because in modern equipment the speed of the conveyor lines is usually such that an observer standing close to the conveyor line and observing same from the side thereof would be almost unable to discern individual containers.

Thus, the containers must not be just pushed off the conveyor line by a rapid action plunger or the like, but preferably, a container to be eliminated from the principal conveyor line should be more or less gently pushed onto a second conveyor line, running in close proximity and parallel to the principal conveyor line and for a particular distance sufficient to permit performance of the transfer as a smooth operation.

In accordance with the invention it is suggested to arrange a plurality of slats in an endless chain or belt so that a portion of the belt can be arranged side by side with a portion of the principal conveyor line. This belt is being driven so that it runs in the same direction and at the same speed with the conveyor, at least for the particular distance. The slats extend transverse, i.e., nonparallel and preferably at right angles to the direction of the motion of both, the belt and the conveyor line. The slats are individually displaceable along their respective axis of extension. The particular portion of the endless belt which runs parallel to the conveyor line is positioned at a somewhat higher, horizontal level than the conveyor line.

The slats are capable of moving individually over the conveyor line. A slat protracting laterally from the belt in this manner remains a part of the belt and continues to move therewith. The front face of such a slat sweeps over a particular range above the conveyor line without moving relative to the conveyor line in the direction of its motion.

Normally a slat circulates as part of the endless belt in the retracted position. Any displacement of a slat is controlled in the following manner. At first the slat is pushed out of its normal position to a slightly projecting position so that a stationary guide means can engage a cam or control surface of the slat which guide means then take over to control further projection of the slat. The stationary guide means are provided so that the sweeping motion of the front face of the slat relative to the principal conveyor line is a rather slow one. That front face of a gradually protracting slat will engage a container and gently push it laterally from the principal conveyor line and onto the second conveyor line. After having performed this pushing operation, other guiding means cause the slat to retract and to assume again the normal position of a slat in the chain.

For this type of transfer, not every slat is to be pushed as not all containers are to be transferred. Moreover, if neighboring slats would be pushed in immediate sequence, the first one would extend farther over the principal conveyor line than the second one during the period when the guide means causes their protraction. This dissimilarity in protraction and position relative to the conveyor line and any object thereon may impart a rotary motion upon the object and possibly cause it to tumble. Hence, the initial displacement of the slats must be controlled that only one slat can engage a container. The displacer causing the initial displacement of a slat to be controlled subsequently by the guide means, may be a solenoid with a plunger which imparts a short stroke push onto a slat. This solenoid is now selectively controlled as follows.

The respective front ends of the slats are provided with face plates having overlapping configuration. Thus, each individual face plate has a certain portion of its sweeping range in common with the face plate pertaining to the respective preceding slat on the belt, and another portion of its sweeping range is in common with the sweeping range of the face plate of the respective succeeding slat as arranged on the belt. This has two reasons: First, but of lesser importance, it is to be assured that every area of the principal conveyor line can be swept over, i.e., there will be no dead zones. However, if the face plates and the spacing of the slats on the belt is smaller than the size of any container, then even without overlap or even with a gap or dead zone in between neighboring face plates, at least one slat would always engage a container somewhere. However, that is not sufficient for proper operation. The container will, in general, have only a very small surface portion which should be engaged by a face plate of a slat and that small surface portion could be in a dead zone unless overlapping of neighboring face plates to positively exclude such dead zones in the sweeping process. A container will, in general, not have a particular, planar flat surface facing the several slats in a parallel relationship, i.e., extending perpendicular to hte direction of relative slat motion during a pushing operation. For example, if the container is a round bottle, and if the conveyor is assumed to be horizontal, only a small, i.e., narrow, vertically oriented portion of the bottle faces any slat in plane parallel relationship and it is that portion which a slat must engage. More particularly, a bottle must be pushed by a slat in accordance with the following rule.

The direction of pushing must extend transversely to the surface portion of the container as engaged by the slat and the normal to that surface portion must intersect (or at least come very close to) the vertical normal through the center of gravity of the bottle. If this rule is observed it is assured that the slat does not impart a rotary momentum upon the container as such momentum may tend to delay the container. For example, if the trailing edge of a slat engages the bottle and pushes it into a different direction, the bottle may begin to rotate and may tumble and fall, or the bottle may move backwards and towards the respectively succeeding bottle on the conveyor. This now leads to the second reason for the overlapping configuration of the face plates of the slats.

By employing overlapping face plates or ends of the slats it can be assured that there is always available a slat which may engage the container in the desired area thereof and in accordance with the rule outlined in the previous paragraph. Moreover, it is undesirable that a slat engages a desired, usually very small area of a container, with a portion of the face plate rather close to any of the leading and trailing edges thereof. Should, for any reason, there occur relative motion between slat and container after engagement and along the surface of the face plate, that face plate still must not lose contact with the desired area of contact of the container. The overlapping configuration of the several front faces of the slats permits selection of a particular one among the slats which will engage a container with a portion of its front face not too close to either edge of the face plate of a slat.

There is provided accordingly a selection control for the slats to select a particular one which will engage a container in the desired area thereof and with a portion of the face plate farther apart from any of its edges than the preceding or succeeding slat would be able to. Hence, a slat is selected if the point or area of contact of its face plate with a container is anywhere from approximately the midpoint of the overlapping portion with the preceding slat to approximately the midpoint of the overlapping portion with the succeeding slat. The selection control requires ascertainment of the relative position of the container to the several slats to select the desired one in accordance with that rule. That slat selection may occur at any stage of the process and whenever it has been ascertained (1) what the position relation is between a container and the slats and (2) that the particular container is, in fact, to be pushed from the main conveyor line. Once this has been ascertained with certainty, one particular slat may be displaced. This displacement may occur well ahead in time before the displaced slat enters into the range of the guiding means which takes over subsequently to cause the slat to perform the sweeping motion, whereupon the particular container is transferred to the other conveyor belt.

Since the slat displacer is stationary relative to the slats as far as regular motion of the belt is concerned, each slat can be reached by the displacer for displacement for a limited period of time. The control for selecting and displacing a particular slat is performed in particular by generating signals representing particular limited time intervals, which follow in periodic sequence, and during which a particular slat may be displaced by a displacer such as the plunger of a solenoid. The actual displacement will occur only if it has been ascertained additionally that the particular slat has, in fact, a position relative to a container so that it can be regarded as being the desired one for engaging the container. An additional condition for control may be that the particular container is, in fact, desired to be transferred.

That latter condition concerning selection of particular containers exists only in those cases where the transfer is a selective one. The entire device as described, however, finds utility also, for example, in those cases in which all containers are to be transferred from one conveyor belt to the other. This is particularly of interest for a transfer of all containers, e.g., from one conveyor belt to another one. The transfer can be performed smoother if carried out laterally instead of from end to end between succeeding conveyor belts. For lateral transfer between belts, there is little space needed between the belts, whereas due to the rounded ends of two such conveyor belts when placed end to end, it is necessary to interpose a rather large stationary element in between the two belts to overbridge the two rounded portions thereof, which is a very undesirable feature as it retards the motion of the containers. If the transfer can be performed from side to side and using the equipment outlined above, a much smoother transfer is possible; in this case, of course, no selection as to any individual container is necessary. On the other hand, the transfer mechanisms of the type presently described does not permit displacement of just all of the slats, for reasons already mentioned so that the slat selection on the basis of the relative position between containers and slats is still necessary.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
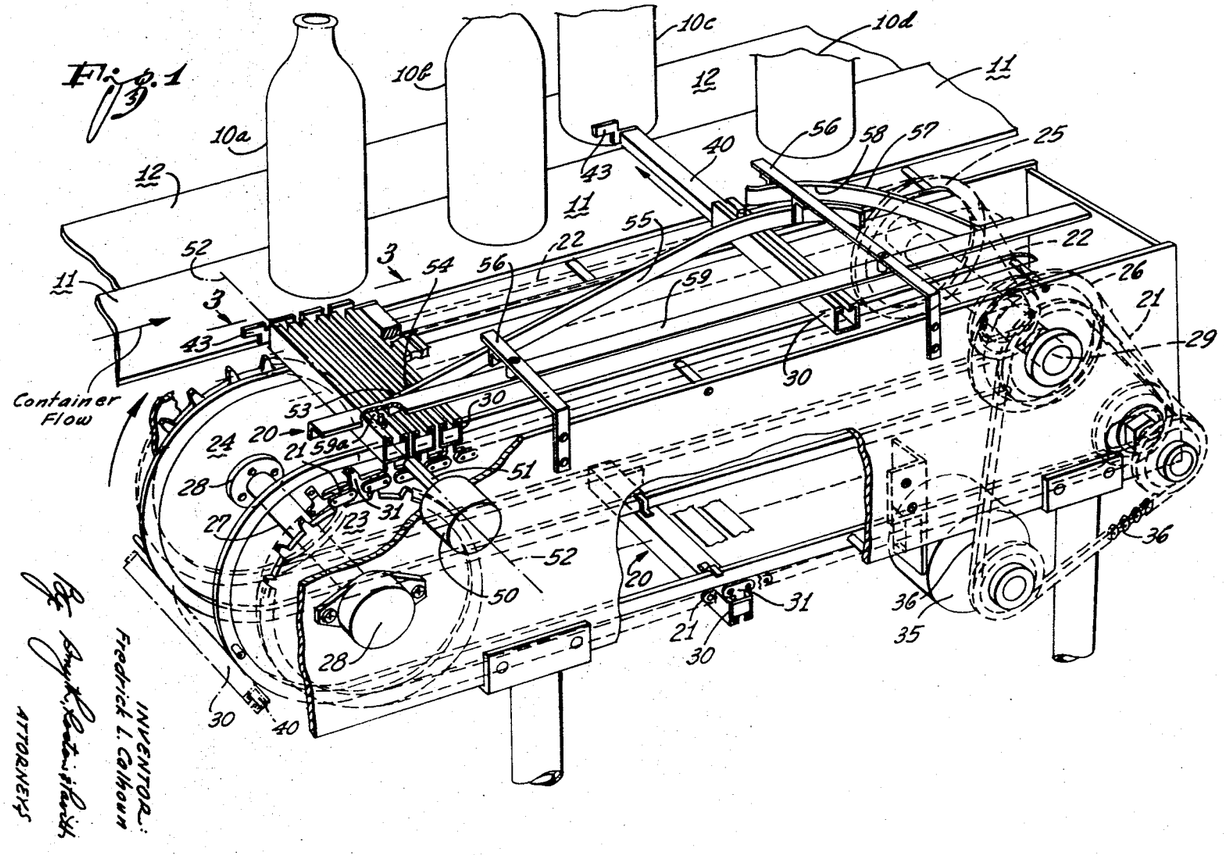
FIGURE 1 is a perspective view of an apparatus in accordance with the preferred embodiment of the invention.

Proceeding now to the detailed description of the drawings, in FIGURE 1 thereof there is shown a bottle ejector mechanism in accordance with the present invention. Containers such as bottles 10a, 10b, 10c, 10d etc., are normally conveyed on a conveyor line or belt 11, which is only partially shown in FIGURE 1 and which may lead, for example, from a processing station to another processing station. For example, it may lead from a cleaning station to a filling station or from a filling station to a packing or closing station, etc. The details of such stations are not of importance here.

In parallel to the conveyor line 11 runs a second conveyor belt or line 12 driven to run in speed and phase synchronism so that there is no relative motion between the lines 11 and 12. The conveyor line 12 terminates in a different station and its principal function is to receive those bottles from line 11 which it is undesired to convey or transfer to the normal destination for the bottles on line 11. For example, the bottles which are to be transferred from line 11 to line 12 may have been found to be defective, not clean, improperly filled, etc. The system shown additionally in FIGURE 1 and particularly in FIGURES 2 and 3 now provides for removal of bottles from conveyor line 11 and placement thereof on conveyor line 12 without stopping of either conveyor line.

The system of principal interest is comprised of an endless chain or belt 20 which includes a pair of chain elements 21 and 22. These chains are respectively engaged by sprocket wheels 23 and 24 in the rear as well as by sprocket wheels 25 and 26 in the front. The sprocket wheels 23 and 24 are mounted on a common shaft 27 journaled in bearings 28. The sprocket wheels 25 and 26 are similarly mounted on a common shaft which is journaled in bearings 29, only one of which is shown in FIGURE 1.

A plurality of channels or chutes 30 are mounted to these chains 21 and 22 by means of brackets 31; they are regularly spaced. The channels or chutes extend transversely to the direction of motion of the chains 21 and 22. Chutes and chains together define the endless belt 20 proper. As shown best in FIGURE 2 each channel or chute has an open construction as to the top but there are retaining flanges 32 and 33. The bottom of each channel or chute has a plurality of rivets 34 arranged in alignment along the axis of each chute. The ends of each chute are open.

Upon rotation of the sprocket wheels the channels or chutes are moved along a particular travel path, a portion of which runs alongside the conveyor line 11 and at speeds in synchronism therewith. The chutes are positioned so that their inner bottoms travel somewhat above the horizontal surface plane defined by conveyor line 11. The sprocket wheel 25 is driven by a motor 35 through a suitable transmission such as belt 36. The system is described here as an autonomous unit which can be placed alongside of any conveyor system. For this case the motor 35 should be speed adjustable to ensure synchronism of motion of the belt with the conveyor system. For more accurate control the motor 36 can be controlled by a circuit deriving appropriate control signals from the conveyor line 11 or its drive and in a manner known in general for follower drives. Alternatively, the belt 20 could be geared directly to the conveyor 11 or its drive, thus necessitating the incorporation of the ejector mechanism in the conveyor system.

Each channel or chute receives a gaiting means such as a slat 40 which is slidably disposed in the chute with sliding permitted in the direction of extension of the chute. Otherwise a slat is retained in a chute by the flanges 32 and 33 thereof. The bottom of each slat has an elongated groove 44 along its axis of extension. The rivets 34 slide in the groove 44 when the slat is displaced in the chute. The individual slats may have, for example, a flat, rectangularly shaped rear surface 41. On the top surface of each slat 40 there is a pin 42 which projects through the flanges 32 and 33 above the open top of the chute which respectively receives the slat. The pin 42 may be considered as a part of the gaiting means. As the chute is open at both ends, the rear surface 41 of a slat is exposed and faces away from the conveyor belt 11.

Figures 2, 3:
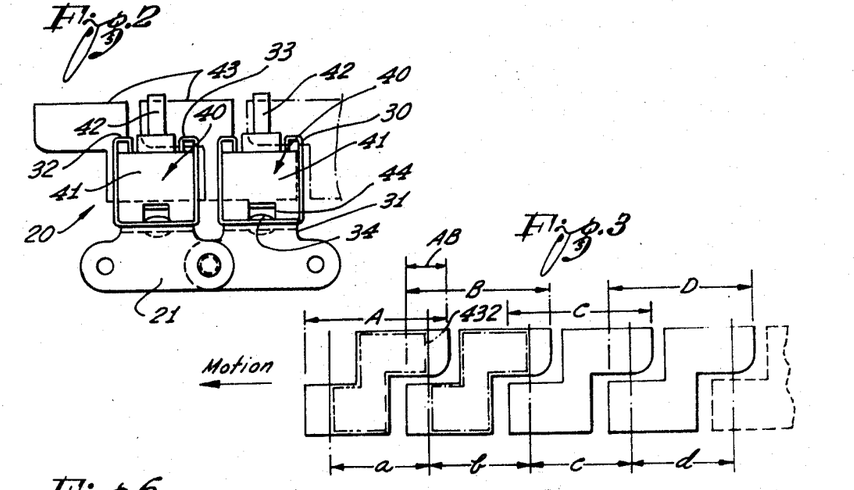
FIGURES 2 and 3 illustrate plan views of details in the apparatus illustrated in FIGURE 1.

A front or face plate 43 is mounted on the front of each slat having the configuration as shown best in FIGURE 3. Should a slat be pushed in its respective chute its front plate sweeps over a portion of conveyor belt 11 and it may engage a bottle and push same onto conveyor belt 12. Due to the overlapping position relation between neighboring front or face plates 43, neighboring slats, if pushed, would sweep over a particular overlapping region which is common to the two sweeping ranges of the two slats. This way it is assured that every spot of the conveyor belt 11 can be swept over by a slat. As schematically indicated in FIGURE 3, a plurality of neighboring slats, i.e., the respective front plates thereof sweep respectively over ranges A, B, C, D or E. These ranges, as thus defined, extend in the direction of motion of the several belts for the indicated width and due to the fact that the endless belt 20 moves in synchronism with the conveyor line 11 the respective sweeping ranges extend clear across the belt 11 and travel therewith.

Normally the slats are fully retracted in the respective chutes and do not project above the surface of belt 11. A solenoid 50 with an armature serving as plunger 51 is suitably mounted to the support structure for the endless belt 20. The plunger may have a center line 52 along which it may move. However, plunger 51 has only a short stroke. Upon energization of this solenoid 50 the plunger 51 can project for a short distance in the direction of extension of the chutes and the slats. A spring (not shown) may be provided to retract the plunger after deenergization of the solenoid 50. The plunger 51 is positioned so that for deenergized solenoid it does not interfere with the motion of the chutes, etc. Upon energization of the solenoid, the plunger can engage the respective rear surface 41 of the slat then in front of the solenoid. The energization of the solenoid should last only for a very short period, if the plunger temporarily projects somewhat into a chute when moving laterally to the plunger, in which case the plunger must retract quickly indeed before engaging the side wall of a chute. However, the chutes or channels may be shorter than the slats and the latter may project rearwardly beyond the chute, so that the plunger, when actuating a slat, does not enter a chute. Still alternatively solenoid 50 and plunger 51 may be positioned so that the plunger 51 pushes against the pin 42 of the slat. In this case, the plunger does not have to be retracted as quickly. In either case, the plunger pushes the respective slat for a short distance in its chute. Should this occur then the pin 42 of such a slat becomes displaced in relation to its normal path.

There is now provided a wedge element 53. Normally, i.e., when a slat is in the retracted position its pin 42 clears the wedge 53. Thus, without further measures a slat would and will normally circulate with the belt 20 in the retracted position and on the side of a mounting bar 59 facing away from conveyor line 11. If, however, the plunger 51 has pushed a slat with pin for the distance of the stroke of the plunger, the pin moves through a window 59a in bar 59. Upon continued motion of the chute containing that slat the pin 42 thereof finds itself on the other side of bar 59 and of the wedge 53 and also in engagement with a cam surface 54 of a rail 55 mounted on suitable brackets 56. The rail 55 extends at an acute angle to the direction of motion of the belt 20 so that the cam surface 54 causes such a pin 42 to be moved gradually transversely to the direction of regular motion of the belt 20. The slat, of course, is caused to follow that motion imparted upon it by its pin.

The slat controlled in such a manner now sweeps across the conveyor belt 11 so that its respective front plate 43 can sweep over a particular range of conveyor belt 11. Should a bottle be in the path of the front plate, the bottle will be pushed from the conveyor belt 11 to the conveyor belt 12.

As the slat, the conveyor belt 11, and the second conveyor belt 12 all continue to move in the same direction and at the same speed, a bottle can thus be transferred without retardation. The total stroke of each slat is, of course, proportioned so that a bottle can, in fact, be pushed from any position it may have across the width of the conveyor 11 onto the conveyor belt 12 and preferably in a central position thereon.

The transverse, controlled motion of the slat is reversed by a rail 57, also mounted to one of the brackets 56 and having a somewhat concavely curved wedge surface 58 which engages the pin 42 from the other side to limit the motion of the respectively displaced and projected slats. The rail 57 now causes a projected slat to be retracted again and to return to its normal position in its chute. Thence, rail 57 guides a slat to assume again the regular position in its propagation path as an undisplaced element of the endless belt 20. In particular, rail 57 will cause retraction of a slat so that its pin 42 will clear again wedge 53 after a complete revolution of the belt 20 unless the particular slat is displaced again by the plunger 51.

One can thus see how bottles can be ejected from the conveyor line 11 and, for example, as illustrated, be pushed onto a neighboring conveyor line such as 12. The dynamics of this transfer process, however, requires some more detailed consideration. The bottles are usually round but may not have too regular surfaces. Nevertheless, if the bottle is ideally round, i.e., cylindrical, then there is a particular (vertical) surface line defining the surface portion of the bottle closest to the undisplaced coplanar surfaces of the several slats as they travel together. There will be one particular slat for which that distance is the closest and if this slat is displaced, it will, in fact, engage the bottle at that particular surface line. It is undesirable that a bottle is caused to tumble or rotate as that would slow down the bottle and it may roll off the engaging surface of the slat so that the ejection or transfer of the bottle would not be complete or the bottle may even fall. This condition could be induced, for example, if a slat, when pushed, does not engage the bottle in an area closest to the line of slats but at a surface portion somewhat ahead or in the rear thereof.

Figures 4A, 4B, 4C, 9, 10:
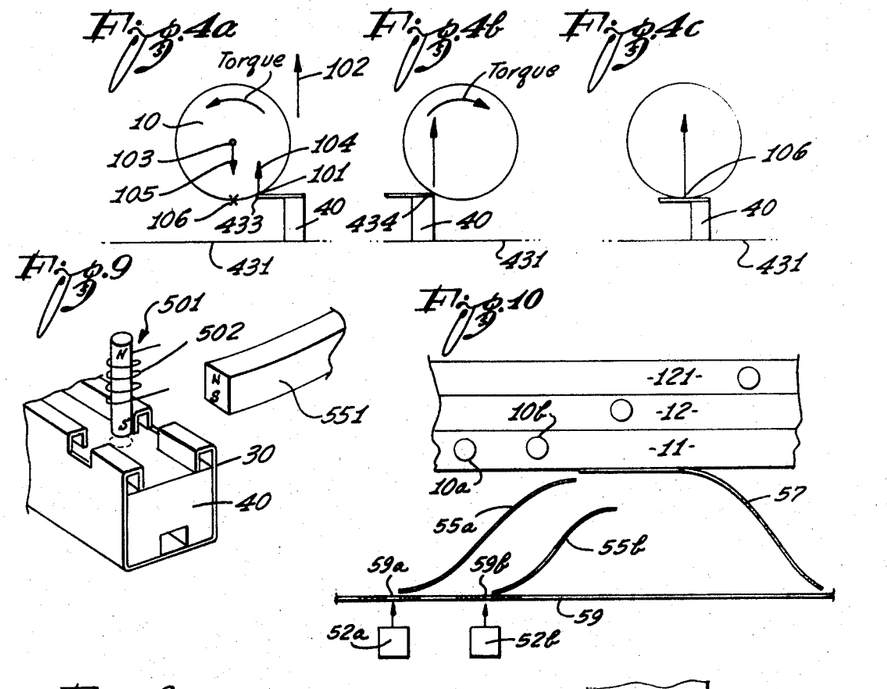
FIGURES 4a, 4b, 4c and 4d illustrate schematically different operating conditions for the container ejection practiced with the apparatus shown in FIGURE 1.
FIGURE 9 illustrates a constructional detail.
FIGURE 10 illustrates schematically a modification of the apparatus shown in FIGURE 1.

FIGURES 4a and 4b illustrate representative examples of undesired situations of bottle-slat interactions. In FIGURE 4a the rear edge 433 of a front plate 43 of a slat engages the bottle 10 at a spot 101. The slat moves by operation of the guide 57 (FIGURE 1) in direction of arrow 102. Dot 103 marks the vertical through the center of gravity of the bottle 10. The force with which the slat pushes the bottle is denoted with arrow 104. The frictional reaction force acting on the bottle wherever the belt 11 engages the bottle has a resultant 105 which can at least be approximated as originating where the vertical 103 traverses the surface of belt 11. As one can further assume that the slat engages the bottle below its center of gravity the pushing force 104 can be projected into the surface plane of belt 11. Thus, a torque is imparted upon the bottle by the two forces 104 and 105 tending to roll the bottle towards the rear and actually out of engagement with the slat. One can see that in case of FIGURE 4b the leading edge 434 of the slat can impart an oppositely oriented torque upon the bottle.

Figures 4D, 8:
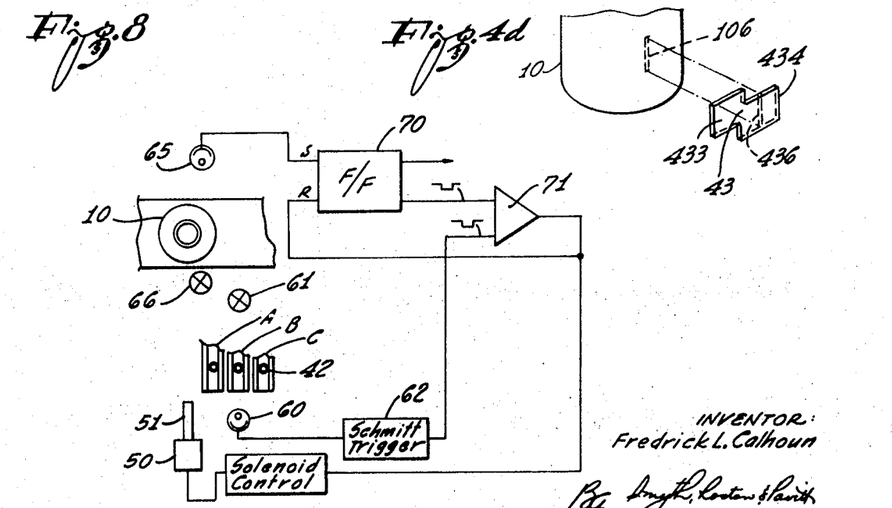
FIGURE 8 is a circuit and block diagram for operating the apparatus shown in FIGURE 1, somewhat modified as compared with the operation established with the circuit in FIGURE 6.

FIGURE 4c shows the most desired relation, where a centrally located surface portion of the front plate of a slat engages the bottle in a narrow, vertical surface area, identified here by point 106 and which defines the closest distance of the bottle to lines of slats in the unretracted position (line 431); point 106 thus marks the vertical line of desired engagement of the bottle with a slat. As shown in FIGURE 4d, the incremental surface area 106 of the bottle 10 will engage the coplanar oriented surface incremental surface area 436 of the front plate a slat, which area 436 is remote from leading and trailing edges, 434 and 433 respectively, of the front plate.

The surface area 106 of a bottle is thus characterized by a coplanar orientation to the surface of the front plate of a slat. Moreover the surface normal through the area 106 (1) is also colinear with the direction of contemplated bottle transfer and (2) intersects the vertical normal through the center of gravity of the container. For a round bottle and for a slat surface orientation parallel to the direction of motion of the conveyor belt, that surface portion 106 is then also the area closest to the line of slats. In the following this area 106 will be referred as the desired surface area of contact of the container. For pushing or transporting a bottle one should select the particular slat which is the closest to establish the ideal situation, whereby the overlap of the front plates makes it possible, that one never has to use a portion of a front plate too close to one of its edges. This is particularly so because the bottles will never be ideally round, and, as was stated above, for some reason a bottle may move somewhat transversely to the direction of pushing and it may roll off the slat if the initial contact was too close to one edge of the front plate of the slat.

One can see, therefore, that a set of conditions for the selection of the particular slat exists, namely, that a bottle must be ejected by one slat and one slat only and that the slat must be sure to engage the bottle at a surface portion thereof closest to the line of slats in the direction of ejection. For a round bottle that will be a point or a (vertical) surface line on the bottle which (1) extends transversely to the direction of motion of the slat, (2) is closest to the line of slats and (3) defines, so to speak, an incremental surface portion of the bottle having a surface normal which intersects the vertical normal through the center of gravity of the bottle. This horizontal surface normal though the desired area of contact will also be called the horizontal center line of a bottle. The incremental surface area of the bottle must engage a central portion of a front plate of a slat pushing in the direction normal thereto, i.e., the direction of pushing must likewise intersect or come at least close to the vertical normal through the center of gravity of the bottle.

One can see, therefore, that for each front plate of a slat in relation to the front plate of either of the respective two neighboring front plates there exists a most favorable area of engagement with a vertical surface line of a bottle defined above as the required surface area of contact. Each slat, as stated, has a range of possible engagement with any object on the belt 11 which ranges are respectively denoted in FIGURE 3 with numerals A, B, C, D and E. The regions A and B of the respective two slats, for example, have an overlapping region AB of action. The middle of that region of overlap is identified by a dotted vertical line 432. The surface portion of the front face of slat B circumscribed by a dash-dot line is that region which, when engaging a bottle in the above-defined most desired surface area, is better destined to perform the pushing operation than any other slat. The dash-double-dot region outlined on the surface of the face plate of slat A defines the most favorable surface area of that slat. The line 432 marks the changeover point and is defined more generally by a vertical line having equal distance from the leading edge of one front plate (here B) and the trailing edge of the partially overlapping front plate pertaining to the respective neighboring slat (here A). Therefore, for each slat with associated front plate there exists a region of most favorable action which is smaller than the region of possible action of such front plate. These regions of most favorable action extend from center-point to center-point of the two overlapping sweep regions which each slat has with its two neighboring slats. These ranges of most favorable action are denoted with reference numerals $a$, $b$, $c$ and $d$ in FIGURE 3.

Therefore, for the particular type of front plate chosen a front plate should be caused to engage a bottle only if it can do so in its most favorable range. The most favorable ranges of the several slats and front plates follow in sequence, without overlap and without gap. The slat control must thus be chosen so that the bottle engages the slat in the most favorable range of its front plate.

In the following the conditions for the ejection control shall be developed for the general case. As a point of reference we are using the center line 52 for the plunger 51 which initially displaces a slat for subsequent sweeping over the conveyor line 11. The plunger, as stated, moves only transversely to the direction of regular or conveyor line and of belt 20. Thus, it is proper to refer to the line 52 as a line or point of reference for the motion of the conveyor lines and of the elements (chutes and slats) of the belt 20 past the plunger. Each slat, as stated, has a rear surface 41, or in the general case it has an element exposing a rearwardly directed surface adapted for engagement with the operating plunger 51. While the plunger could be of the needle type, in the general case it will be a cylinder having a front operating surface for pushing in whole or in parts against the control surface 41 of a slat 40. These slats are necessarily spaced apart on the chain as each slides in its own guide chute 30. Thus, the control surfaces of the neighboring slats are somewhat apart in the direction of the circulating motion of the chain. The plunger, in turn, may be sufficiently small so that it will never engage two slats at the same time. Below we shall discuss that this, however, is a possibility which does not have to be excluded for the general case.

Figure 5:
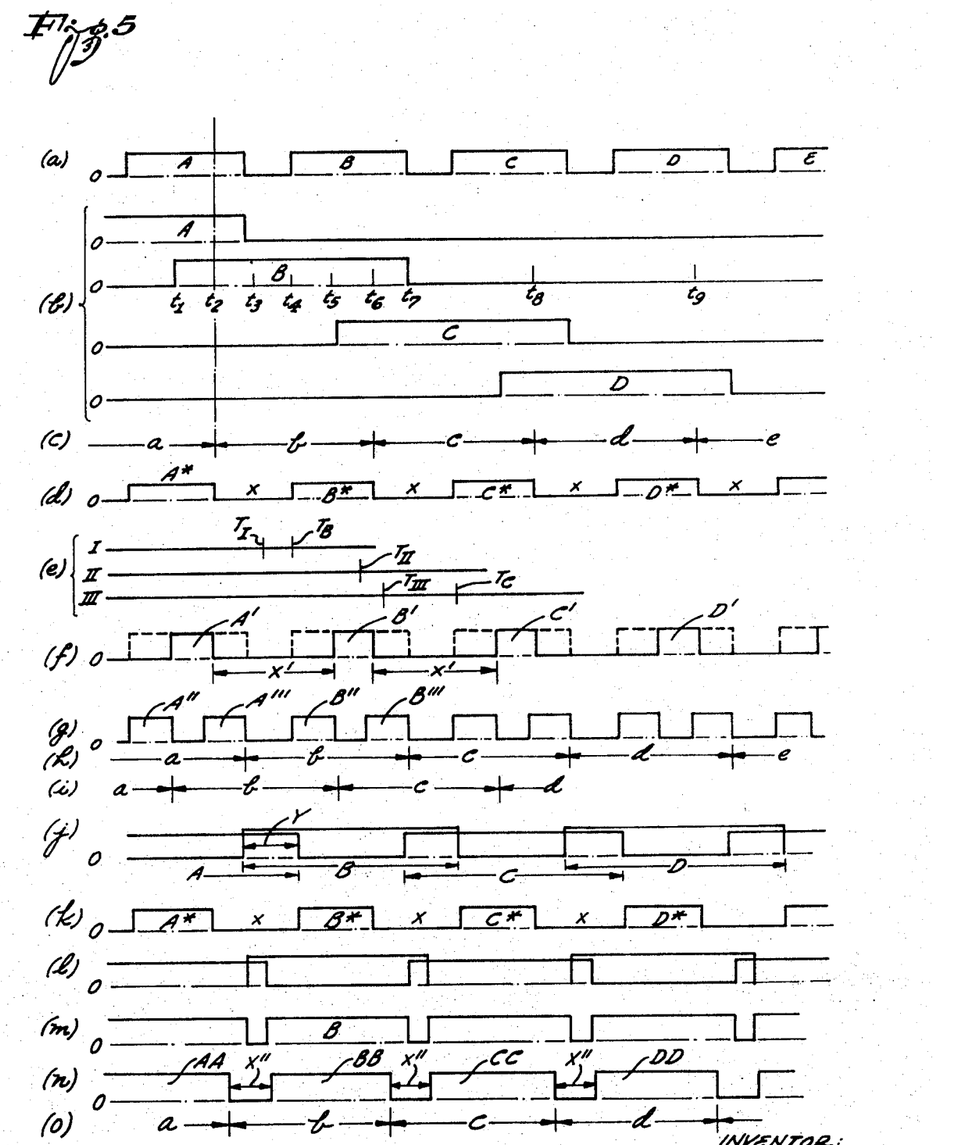
FIGURE 5 illustrates in several lines, relevant signals and schematic representation of operating conditions in the apparatus shown in FIGURE 1.

In FIGURE 5a there are plotted symbolically periods of time where the plunger could engage a slat for displacement, and there are, furthermore, plotted interspaced periods where such operation is not possible. In the following they will be called respective periods of possible or impossible operation. This representation, as stated, is a schematic one and is representative of the general case. The design of the system is not critical as to the duration of an operating period in relation to the respective succeeding pauses except that the design should not be marginal, i.e., the operating period should not be too small. A slat to be used for ejection must thus be displaced during the respective period of possible operation of the slat. In FIGURE 5a the periods where the slats 40, individually identified by the same symbol used to identify their possible sweeping range, A, B, C and D are in position for engagement with the plunger are illustrated in form of signals. These signals could be developed by appropriate scanners, but that is not essential for practicing the invention though conceivable. Thus FIGURE 5a illustrates hypothetical signals which identify the periods in which pushing of a slat is possible followed by respective periods in which the pushing of any slat is not possible. The abscissa of FIGURE 5a is time and the phase of the diagram is referenced in time against the chosen point of reference which, as stated above, is the center line 52 of the plunger 51.

FIGURE 5b is now a representation of the periods of time where the front face plates 43 of the several slats pass through a point of reference. Presently, this may be any point along the extension of the belt and does not have to be line 52; i.e., presently we do not compare the phases of FIGURES 5a and 5b. These periods are identified in the drawing in form of signals; these signals do not have to be developed as such but they could be so developed. Due to the overlap of the face plates the periods do naturally overlap.

Since slats and bottles travel in the same direction and at the same rate, and transversely to the direction of controlled slat motion, each instant as plotted along the several abscissas in FIGURE 5b can define also an instant when a desired area of contact of a bottle passes through the point of reference. Hence, FIGURE 5b can also be interpreted in that the abscissas define possible positions of a bottle relative to the several slats. If the passage of the desired area of contact of a container, i.e., of the horizontal center line thereof through the point of reference were represented by a signal, the phase of such a signal relative to the signals A, B, C, etc., in FIGURE 5b would then represent the relative position of a container to the slats.

Considering FIGURE 5b in some greater detail, the time $t_1$, for example, marks the point in time when the leading edge of the face plate of slat B passes through the point of reference for FIGURE 5b. Should the horizontal center line of a bottle pass through the point of reference also at time $t_1$ then slat B could engage with its leading edge the point of desired engagement of the container, provided that slat B is being pushed so that it can engage the bottle. As this engagement would involve the leading edge of the slat face, this would be an undesirable situation as the slat edge may still tend to rotate the bottle. Slat A could then be used.

At the time $t_2$ a vertical surface line of the upper portion of the face plate of slat A and a registering vertical surface line of the lower portion of face plate of slat B pass through the point of reference of FIGURE 5b which vertical surface lines are respectively equally far from the leading edge of the face plate of slat B and the trailing edge of the face plate of slat A. Should a bottle be positioned so that its horizontal center line passes through the point of reference at such time $t_2$ then slats A and B would be equally good for causing ejection as the front plate of either slat would engage the bottle at the point of desired engagement and equally far from the respective nearest face plate edge. It follows, therefore, that prior to time $t_2$ the slat A is preferred over slat B for ejection operation. After time $t_2$ slat B is preferred over slat A. If the center line of a bottle passes through the point of reference after time $t_2$, this would be representative of the fact that the desired area of contact of the container would engage the face plate of slat A, if pushed, too close to the trailing edge thereof.

At the time $t_3$ the trailing edge of the face plate of slat A passes through the point of reference for FIGURE 5b, and should the center line of a bottle be passing through the point of reference at the same time $t_3$, the bottle would subsequently engage the trailing edge of the face plate of slat A should slat A have been pushed. However, as stated above, subsequent to the time $t_2$ the slat B is in a more favorable position for the ejection operation. At the time $t_4$ the center of the face plate of slat B passes through the point of reference and it is the most desirable situation for ejection as far as slat B is concerned.

At the time $t_5$ the leading edge of the face plate of slat C passes through the point of reference while a vertically aligned portion of face plate of slat B passes also through the point of reference. At that time slat B will still be preferred over slat C. At the time $t_6$ vertically aligned surface lines of face plates of slats B and C pass through the point of reference respectively equally far from the trailing and leading edges of the face plates of slats B and C, should the horizontal center line of bottle pass through the point of reference at time $t_6$, the slats B and C would be equally good for ejection engagement with the bottle. Thus, $t_6$ is again the time for a selection changeover. If subsequently to $t_6$ the center line of a bottle passes through the point of reference, the slat C will be preferred over slat B because the engaging portion of its face plate is then farther from one of its edges than a corresponding engagement portion of the face plate of slat B from its edge would be.

At the time $t_7$ the trailing edge of the face plate of slat B passes through the point of reference. It follows from the foregoing that the slat B is best suited for ejection if the horizontal center line of the bottle passes through the point of reference in between times $t_2$ and $t_6$. Prior to $t_2$ slat A is suited better and subsequent to $t_6$ slat C is suited better. The times $t_8$ and $t_9$ in FIGURE 5b correspond to the $t_2$ and $t_6$ as far as relative significance is concerned. Thus, if the horizontal center line of a bottle passes through the point of reference at the time $t_8$ slats C and D are equally good and at the time $t_9$ slats D and E are equally good.

Turning now to FIGURE 5c of the drawing, one can see the following slat selection scheme. Times $t_2$, $t_6$, $t_8$ and $t_9$ are marked changeover points for the slat selection. During the periods marked $a$, $b$, $c$ and $d$ respectively slats A, B, C and D are suited best to cause ejection, if the horizontal center line of a bottle passes the point of reference for FIGURES 5b and 5c at any time during periods of $a$, $b$, $c$ or $d$, etc.

As stated, FIGURES 5b and 5c are drawn with reference to any arbitrary selected point and its significance is the phase in time of the passage of the horizontal center line of a bottle through that point of reference. Hence, the detection of the passage of the horizontal line of a bottle in time gives the relationship of the bottle to the respective front faces of the several slats relative to the passage of the front faces of the slats through that point of reference, and more particularly relative to the passage of those portions of the front faces destined for operation in accordance with the slat selection scheme. Of principal importance is thus the phase of the bottle detection in relation to that selection scheme of FIGURE 5c. That selection can be made principally at any time, so that the reference point for that selection can be regarded as arbitrary.

From a general viewpoint, the rule for slat actuation control could thus be stated as involving the following principles: Detect position of desired area of contact in relation to the face plates of the slats, and select slat in accordance with the desired selection scheme of FIGURE 5c, then actuate solenoid for displacing the selected slat. As long as the position detection and the subsequent displacement of the selected slat were carried out more or less independently, it would be required to generate the signals of FIGURE 5b or 5c as well as signals representing the passage of the horizontal center line of the bottle through the chosen point of reference and to correlate the signals so as to generate slat selection signals proper. On the other hand, the generation of actual signals representing the selection scheme of FIGURE 5c can be dispensed with, if the point of reference chosen for bottle detection bears a particular relation to the reference line (52) for the plunger-slat interaction, so that the phase of the signals identifying bottle passage and the hypothetical signals of the train shown in FIGURE 5a imply a particular phase as between them and the hypothetical signals of FIGURE 5b or 5c. Out of this superpositioning or correlation of hypothetical signals one can develop rules for controlling the slat displacer in response to the bottle detection signals. One can see the necessity for this, because it would be exceedingly cumbersome to generate signals which particularly identify individual slats for the selection. Instead, it is desirable to permit correlation between bottle position detection, slat selection and slat displacement in the manner that the bottle position detecion can be used directly to control the slat displacement operation whereby it is implied positively that the displaced slat is, in fact, the correct and desired one. In other words, by particularly choosing the detection point for the horizontal center line of the bottles, the phase for the selection scheme becomes fixed and the slat displacer (solenoid 50) must now be controlled in accordance with specific rules evolving from the now resulting phase of the hypothetical signals in accordance with the desired slat selection and the hypothetical signals representing periods of possible slat actuation without requiring particular slat identification. Specifically, if a signal representing the passage of the desired area of contact of a bottle (horizontal center line) through the chosen point reference falls into a period representative of the selection of a particular slat as well as into the period of permissible actuation of that slat, that slat can be actuated. Thus, the bottle position detector must be positioned so that its output can directly actuate the solenoid and one is certain that the correct slat will be displaced.

The implementation would be rather simple if the periods of possible plunger-slat interaction would follow without gap, as then, by positioning of the bottle position detector one can select the phase of the selection scheme to exactly coincide with the sequential periods of possible solenoid operation for slat displacement. This, however, would involve marginal design. Therefore, the more general rule is that the period of possible actuation of a particular slat (as shown in FIGURE 5a) must not terminate prior to termination of the selection period for that slat in accordance with FIGURE 5c. The phases of the diagrams in FIGURES 5a, 5b and 5c relative to each other (i.e., vertical alignment) have been chosen so that the rule is fulfilled. That choice does not have to be a particular one, and the choice is a proper one if, for example, periods A and $a$ have a period in common.

The correlation of the slat selection in accordance with FIGURES 5c with the periods of possible slat actuation in accordance with FIGURE 5a as chosen thus results in FIGURE 5d showing the periods where slat actuation is permissible to satisfy the selection scheme as set forth in FIGURE 5c. Where selection period $a$ coincides with period A the slat A can actually be pushed; where period $b$ ($d$, $c$, etc.) actually coincides with the period B (D, C, etc.), the slat B (D, C, etc.) can actually be pushed. This is respectively identified by symbolic or hypothetical signals A*, B*, C*, D*, etc., in FIGURE 5d, thus showing the permissible operating periods for the several slats. Wherever a selection period for a particular slat ends, a forbidden period X begins, which in turn ends with the beginning of the possible actuation period of the respective next slat.

The sequence of permissible and forbidden operating periods as chosen in FIGURE 5d represents the general case which is based on the more or less arbitrary sequence of possible and impossible operation periods in accordance with FIGURE 5a and which is further based on the phase for the selection periods as defined by the selection scheme of FIGURE 5c in accordance with the general rule as outlined permitting also a wide range of choice. The limits of the general case and particularly the limits of the choice within operating ranges will be taken up in detail below.

As FIGURE 5d represents the general case in form of a rule for implementation the following can be said. The important point is that a period of permissible operation of a particular slat ends with the end of desired selection of that slat. A period of permissible operation of a particular slat begins at the earliest either at the beginning of the period of possible operation of that slat or at the beginning of the selection period for that slat in accordance with scheme 5c, whichever comes later. If by a suitable position of a detector the passage of the center line is detected during a period of permissible operation (A*, B*, C*, etc.), the plunger can be actuated instantly as the right slat will be pushed indeed. If the detector signal occurs in the forbidden period X, actuation will be deferred until at least the beginning of the next permissible operating period, and again the right slat will be pushed.

FIGURE 5e illustrates now three different cases I, II and III. In case I it is assumed that at a time $T_I$ the horizontal center line of the bottle passes through the chosen point of reference for bottle detection. This falls into the selection period $b$ so that the slat B is to be selected. However, the detection time $T_I$ falls also into a forbidden period X so that the solenoid 50 should not be actuated at that time. Instead, pushing should be deferred until at least time $T_B$ which is the beginning of the period B* for which pushing of the slat B is permissible. One can see further by comparison with FIGURE 5b that at the time $T_I$ no other slat could possibly be used as only slat B could possibly engage the bottle. The delay for the actual actuation is here due to the fact that slat B is out of the range of the plunger 51 at time $T_I$.

Case II, here it is assumed that the center line of the bottle passes through the point of reference at the time $T_{II}$. This time falls also into the selection period B although in accordance with FIGURE 5b slat C could possibly eject the bottle also, but under less favorable conditions than slat B will perform this operation. Since the $T_{II}$ falls also into the period B* where pushing is permissible for the slat B, that slat can actually be pushed at the time of occurrence of the detector signal.

Case III, here it is assumed that the center line of a bottle passes through the point of reference at time $T_{III}$ which is subsequent to the period of time $t_6$ but prior to $t_7$. Thus, slat B could still be used, but slat C is the better one, accordingly, the time $T_{III}$ falls again into a forbidden period X so that actual pushing must be deferred to rather late time $T_C$.

One can see, therefore, that the end of any period of permissibel displacer operation is rather critical and is set by the desirability for a changeover in slat selection at that particular time. Moreover, if a particular slat is to be selected, its actuation must be permissible precisely up to the time when the period of possible selection ends. In other words, the period of permissible displacement of a particular slat should not possibly end earlier than at the time when the selection of that particular slat becomes undesirable. On the other hand, the beginning of the period of permissible displacement is not critical at all and may be later than the time where a period of possible displacement begins. This is an important consideration for implementation as it is thus not necessary to detect, for example, the instant when the condition of possible pushing begins. It is precisely this point why up to this point we have spoken only of hypothetical signals (except the bottle position detector signal), as the ultimate control signals actually to be produced can be produced to satisfy the operational requirements without duplicating all aspects which leads to the particular timing and phasing of the control signals actually needed. Instead, it suffices to provide a gating or enabling period which can be suitably established with little expenditure and which gating periods begin somewhere during the period where pushing of a slat is possible but which ends, however, precisely at the time when a selection changeover is desired. This type of voluntary restriction of the operating periods for the plunger is now shown more particularly in FIGURE 5f. The signals A', B', C', etc., are of short duration and they are now to be considered actual signals representing also periods of enabled operation. Each of them begins long after the time when operation, i.e., pushing of a particular slat has become possible but it ends precisely at the instant of desired changeover.

Figures 6, 6A:
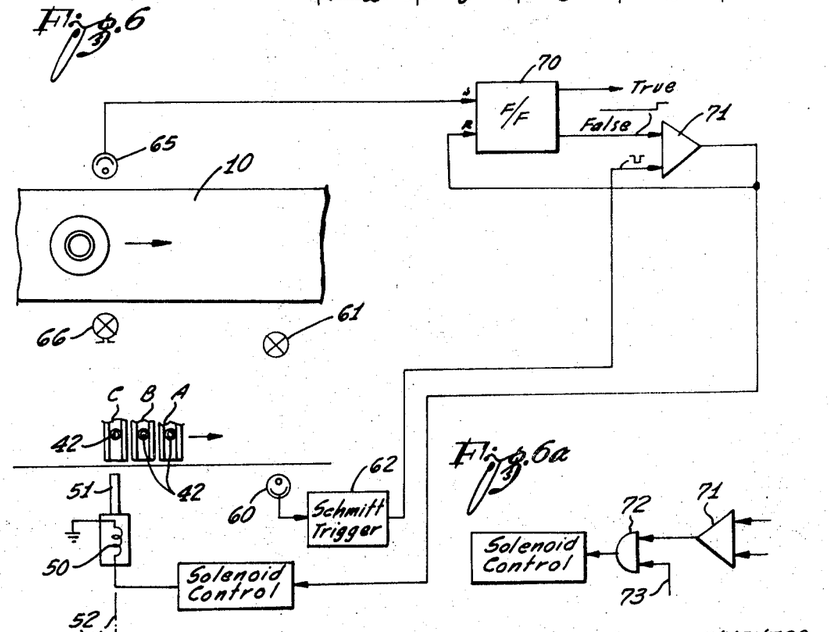
FIGURE 6 illustrates schematically a circuit and block diagram for operating the apparatus shown in FIGURE 1.
FIGURE 6a illustrates a modification for the circuit shown in FIGURE 6.

In FIGURE 6 the photodetector 60 realizes this concept; it scans the location of the pins 42. In other words, the pins 42 pass sequentially through the light path of a light source 61 and they darken sequentially the light which reaches the photodetector 60. The output signal provided by the photodetector 60 is fed to a pulse shaper such as a Schmitt trigger 62 to produce rectangularly shaped pulses of the type plotted in FIGURE 5f. Thus, whenever a pin darkens the beam from source 61, an enabling pulse is being produced at the output side of the Schmitt trigger 62.

For convenience of comparative representation it could be assumed that the detector 60 and light source 61 were positioned so that the optical axis of this system is vertically aligned with the reference line 52 of the plunger operation, which is the reason why in FIGURE 5f the signal blocks A', B', C' appear centrally in the respective blocks A, B, C, D, shown again in dotted lines in FIGURE 5f. In this mode of representation pulse A' would initially be produced by the pin of slat A, etc., and the slat A could then be made to be operated by that signal A'. On the other hand, the production of such signals is a periodic phenomenon and the slats with pins are all essentially similar; hence, one can displace detector 60 with light source 61 laterally from vertical alignment with the plunger line 52 by a distance which is an integral multiple of the distance from pin to pin (center to center thereof). This is now the position of detector 60 actually shown in FIGURE 6. The pulse sequence is still the same except that the actuating pulse A' for slat A is now derived from the pin of another slat.

Upon this pulse sequence one must now superimpose the detection of the horizontal center line of any bottle which, as was outlined above, means that therewith one superimposes theoretrically the desired selection scheme. This must be carried out in the manner that a selection changeover occurs at any falling edge of the pulses A', B', C', etc., hence the selection scheme is superpositioned, i.e., implemented by positioning the bottle detector. At the times of these falling edges of pulses A', B', C', etc., the position of the vertically aligned mid points of the overlapping portions of two particular neighboring slats in relation to the conveyor line 11 actually defines the position for the bottle detector because a container on the conveyor line 11 in that particular position would be equally well pushed by two neighboring slats which is the definition of a desired slat selection changeover. This means that the bottle detector will be rather close to the center line 52. Its actual position will be determined by the geometric relation between plunger, the rear surface configuration of the slat and the relative position of the front plates as well as the configuration of the latter.

The bottle detector is now a second photodetector 65 which is positioned suitably along the conveyor belt 11 to monitor the passage of the horizontal center line of a bottle through the point of reference. Conveniently the detector 65 will respond to the leading side of the neck of the bottle and is thus displaced from the required reference line in the direction of motion for a distance equal to half the outer diameter of the bottle neck. The passage of the center line of the bottle is signaled by a change in signal level for and in the detector 65. Opposite the detector 65 there is a light source 66 so that the light beam normally reaches the detector 65 across the belt 11.

Whenever a bottle neck enters the light path between light source 66 and detector 65, the light reaching the photo-detector 65 dims. Accordingly, the passage of the center line of a bottle through the detector range is signaled by a change in signal level for and in the detector 65 from light to dark. It is repeated that the detection system 60–61 is positioned in relation to the detection system 65–66 so that if the detector 65 goes dark at the time the detector 60 goes light, the vertically aligned mid points of the overlapping portions of two salts are in horizontal alignment transversely to the motion of the motion of the several belts 11, 12, 20 with the horizontal center line of the bottle the neck of which causes the dimming in detector 65.

A change in output signal level as provided by detector 65 is monitored by a flip-flop 70 and it may be assumed, for example, that the darkening signal causes a trigger signal for setting the flip-flop 70. The input circuit for flip-flop 70 may be wired to respond individually to that particular level change. The reset output side of flip-flop 70 is applied to a "nor" gate 71 receiving thus a false signal at the instant the center line of a bottle passes through the bottle detector range. In order to respond, the "nor" gate 71 needs a second false signal and this is now the output signal of the Schmitt trigger 62, which false signal is produced whenever a pin 42 dims the light reaching detector 60 as the period of a false signal as supplied by the Schmitt trigger 62 defines the period of permissible operation for the solenoid 50.

It follows, therefore, that the "nor" gate 71 responds whenever (a) the passage of the horizontal center line of a bottle falls directly into a period of permissible operation of a plunger as monitored by the detector 60 or (b) whenever after passage of the horizontal center line of the bottle through the bottle selector, the next succeeding permissible operating period is being detected. The permissible operating period always ends whenever there is a selection changeover in accordance with the desired rule. That changeover is implemented by a "light" signal in detector 60. Should the passage of the horizontal center line of a bottle be detected during a forbidden period X' then the flip-flop 70 causes this signal to be stored and it holds that information until the beginning of the next permissible operating period. The true output signal of the "nor" gate 71 can thus serve for operating the triggering of the solenoid 50 which operates the plunger 51. The true-signal of "nor" gate can be used additionally to reset the flip-flop 70.

Having explained how, in a representative example, the solenoid as slat displacer can be controlled, the rule was fulfilled by placing the pin detector 60 either parallel to line 52 or at any distance therefrom equal to an integral multiple of the distance between neighboring pins. This way the signal train shown in FIGURE 5f was being realized. The selection rule was then observed by placing the detector 65 so that a significant detector signal (light to dark change) could concur with the trailing edge of any pulse A', B', C', etc., only when the horizontal center line of a bottle intersects the vertical through the mid points of the overlapping face plate portions of two slats. This requires a particular relationship in the placement of detectors 60 and 65 but gives not an absolute rule for either. Thus the position of detector 60 may vary provided that either of its short duration output signals falls fully into a period of possible slat operation.

The two marginal operating conditions are shown in FIGURE 5g. The detector 60 can be placed to produce pulses A", B", C", etc., wherein the leading edges coincide with the hypothetical signal train A, B, C, etc., representing the periods of possible solenoid-plunger operation. Alternatively the detector 60 can be placed so that the pulses are A''', B''', C''', etc., having their trailing edges coincide with the trailing edges of the hypothetical pulses, A, B, C, etc. As the relationship between detectors 60 and 65 must be maintained, the detector 65 will be displaced accordingly. FIGURE 5h illustrates this by the placement of the particular phase of the selection periods a, b, c. The selection changeover points are aligned with the trailing edges of signals A", B", C", etc. A different phase for the selection periods a, b, c, etc., and for the changeover points is needed when the periods of permissible operation are defined by pulses A''', B''', C''', etc.

Essentially up to this point the system has been described so that every bottle will be ejected by the slat suited best. However, as stated above, the system will be used primarily to cause ejection of selected bottles in a sorting process. For example, bottles found to be deficient in any manner may have to be ejected from the conveyor line 11. Hence, the ejection control requires an additional signal, to identify the bottles actually to be ejected while preventing ejection of bottles not to be ejected or transferred. There are, of course, conceivably numerous reasons for ejecting or nonejecting a bottle. However, some of the most important areas in the field of bottle inspection have been outlined above. The bottles must be intact, i.e., not chipped, and must be clean, properly filled, labeled, etc., to pass the respective inspections.

Otherwise the bottle is to be separated from the one passing the inspection. That separation is done by the ejection presently described.

The circuit of FIGURE 6 can be supplemented as shown in FIGURE 6a and it is merely assumed that a gating signal is applied to a gate 72 for actually permitting the triggering of the ejector solenoid 50 when ejection of a particular bottle is desired. There remains now, however, the problem of properly assocating the bottle whose horizontal center line is position monitored by detector 65, with a process which determines or has determined, whether or not that particular bottle is to be ejected. As schematically shown now in FIGURE 7a, the photodetector 65 may actually be a part of an inspection station being poistioned at the exit side thereof. This inspection station may have inspected, as stated above, cleanliness of the bottle, or degree of filling, and/or absence of defects, etc. Having found the bottle to be deficient a signal issues into the channel 73 as ejection command signal which enables the gate 72 so that in conjunction with the output side of "nor" gate 71 the ejection of that particular bottle can be carried out in accordance with the procedure outlined with reference to FIGURE 6. In this case there is not doubt as to the respective bottle involved because the detector 65 is so close to the inspection station so that the ejection command signal in line 73 is necessarily associated with a soon arriving output signal from the "nor" gate 71 signaling that that particular bottle is now in position for ejection by the appropriately selected slat as outlined above.

Figure 7A:
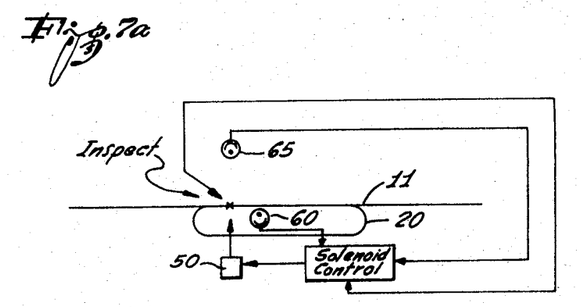
FIGURES 7a, 7b, 7c and 7d illustrate schematically several circuits for storing a representation for the condition of ejection.
Figure 7B:
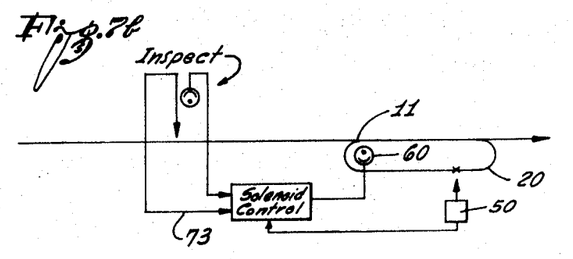

As schematically shown now in FIGURE 7b the inspection station may be positioned somewhat in advance of the ejection station. For example, the inspection station and the ejection control could be in each other's way if postioned so that inspection and ejection could follow immediately. In order to understand the operation of the device shown in FIGURE 7b it is useful to recall that triggering of the ejection solenoid 50 actually does not cause immediate ejection of any bottle, but places a slat into position so that the guiding arrangement 53 and 55 as shown in FIGURE 1 can guide the slat across the conveyor line and shift the bottle gradually from the regular conveyor belt 11 to the reject belt 12, and during a period of time when the two belts and the slats move in the same direction and in speed and phase synchronism. Thus, the essential function of the solenoid 50 is to push the slat so that the cam or pin 42 is in the path of the wedge 53. That prepositioning of a slat is shown in FIGURE 1 to occur (or not to occur) directly in front of the wedge 53. However, the prepositioning can be carried out much earlier, for example, somewhere along the return path of the belt 20 to which the slats are attached.

In FIGURE 7b now, the position detector 65 for detecting the position of the center line of the bottle is not directly near the center line of the plunger but it is mounted in the exit side of the rather remotely positioned inspection station. The plunger 51 of the solenoid 50 is now positioned so that if one would geometrically unfold the belt 20, the position of the plunger axis 52 in relation could be the same as in FIGURE 7a. Thus, the control circuit for this case is exactly the same as shown in FIGURE 6. The only difference is that a comparably long time expires in between the initial displacement of a slat and the actual ejection operation. Thus, the endless belt with the slats work here in addition as a mechanical memory.

Naturally, an arrangement of the kind shown in FIG-7a is limited to spaces where the distance between inspection station and the ejection station is not too much larger than the length of the folded belt 20. This, however, is a restriction of no practical importance because there is no reason to place the inspection station excessively far from the ejector. On the other hand, one can see that the ejection system may well be suited to accommodate a plurality of sequentially provided inspection stations, each testing a particular feature of the bottles and the ejection is then carried out in accordance with the eject command signal from either station. This can be realized by a combination of the system shown in FIGURE 7a with as many systems as shown in FIGURE 7b as feasible. Thus, there may be a plurality of inspetion stations each being associated with a particular plunger arrangement placed along the path of the same endless belt 20, each individually pushing certain slats as selected by the respectively associated inspection station and by the bottle detector 65. The reject bottles for all of these various inspection stations are all being ejected by the same ejection mechanism.

A third mode of operation is shown in FIGURE 7c and again it can be said that this mode may, for example, be used in conjunction with the multiple inspection system described above and particularly for those cases where there is one among the several inspection stations which is too far from the ejection system for the chain to serve here as a mechanical memory. In this case an electronic memory is needed to store the reject command signal until such time that it can be executed. If the bottles are regularly spaced on the conveyor belt the memory may be a shift register in which the state of each bottle "not reject" or "reject" is shifted into the shift register 75, for example, as a true or false signal respectively, and that state is shifted through the register as the bottles progress. At the output side of this shift register that state signal emerges and is used as the enabling signal for channel 73. The photodetector 65 is positioned so that its sensing the passage of the horizontal center line of a bottle concurs with the "reject"-"no reject" state signal in the last stage of the register.

Figure 7C:
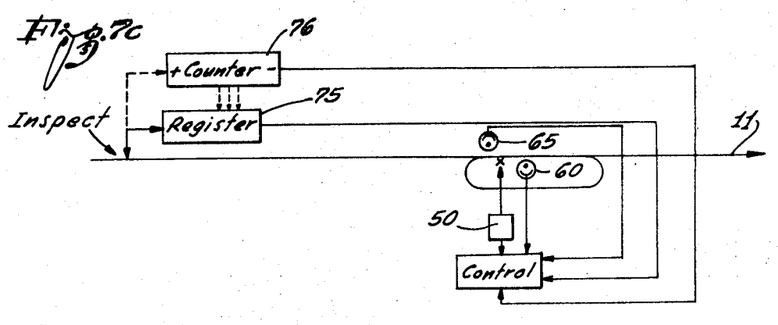

Should the bottles be irregularly spaced then an additional counter 76 is needed to keep track of the number of bottles between the inspection station and reject station. Each bottle leaving the inspection station adds a count, each bottle dimming the light reaching detector 65 subtracts a count. The count number then determines from which stage of the shift register the command signal for line 73 is to be taken.

Figure 7D:
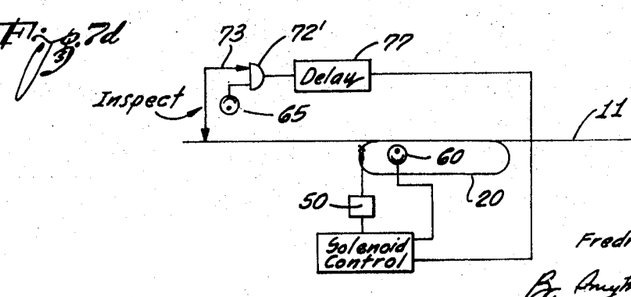

A fourth mode off operation is shown in FIGURE 7d illustrating again the position detector 65 as being positioned rather remote from the ejection mechanism. For describing the operation of the circuit shown in FIGURE 6, it was assumed that optical signal provided by the position detector 65 was used directly and immediately except for a possible delay in flip-flop 70 when occurring in a forbidden period. On the other hand the position of a container could be detected much earlier the corrresponding signal than be delayed for a fixed period of time. This in turn leads to the general rule that the actual position relation of detectors 65 and 60 is not, per se, critical as the output of either signal can be delayed; it is the effective timing of the signals when ultimately used which is critical for the reject control in accordance with proper slat selection. Furthermore, FIGURE 7d shows an additional modification which is applicable to all other embodiments. The inspection control signal in line 73 may be used to immediately gate the output of detector 73 (gate 72') so that the presence of a bottle not to be ejected is not monitored at all.

The delay device 77 in FIGURE 7d thus delays the output of detector 65 for a fixed period of time before being used to set flip-flop 70 in the solenoid controls unit.

The general case for the development of the implementation concerning the slat selection and operation was predicated on the representative sequence of possible and impossible operating periods as far as displacement of a slat by the plunger 51 is concerned. This representative sequence is shown in FIGURE 5a. For that relationship, permissible and forbidden operating periods result from the phase of the selection scheme ultimately determined by the position of the bottle detector (such as detector 65).

The possible operating periods can be shorter as long as sufficiently long permissible operating periods can be established. The period of possible operation can be as short, for example, as the periods A', A" or A''' of FIGURES 5f and 5g. The shortness of these periods thus is a matter of practicability. In the cases of FIGURE 5f the possible operating periods are only a little larger than the permissible periods if, for example, the solenoid 50 with plunger 51 is positioned to push against the pins 42 (used also to generate the signals A', B', C', etc.) instead against the new surface of the slat. Shorter periods of operation will be impractical from standpoint of mechanical stability.

The other extreme for considering the general case is an overlap of the possible operating periods. As shown in FIGURE 5j, the slats may be so close and for the plunger may be so broad that, for example, during the periods Y the plunger, if pushed, would push two slats, an obviously undesirable situation.

The rule covering the desired slat control was stated above as follows: A period of permissible displacement operation for a slat must terminate when the displacement of the slat is still possible. Thereafter operations of the plunger must be forbidden at least (periods X in FIGURE 5d) up to the time the next slat can be pushed (for example, times $T_B$, $T_C$). If, however, the periods of possible pushing of a slat overlap as shown in FIGURE 5j, the rule must be restated in that the forbidden period must extend at least until the present plunger, the selectability of which has terminated, cannot be pushed any more. Thereafter the pushing of that plunger, of course, does not have to be forbidden as its operation is then not possible any more. This was implied where there was no overlap (FIGURE 5a) and there the period of forbidden plunger operation is extended only because the respective next slat may not yet be in position of possible pushing at the time the previous one is out of reach of the plunger. In either case, the result is a sequence of permissible and forbidden operating periods, FIGURE 5k shows them for the overlap case of FIGURE 5j but for the same phase of the selection scheme as shown in FIGURE 5c. By comparing FIGURE 5k and FIGURE 5f one can see that this can be implemented in precisely the same manner. This is particularly so because the implementation shown in FIGURE 6 and FIGURE 5f operates with a voluntary restriction of the actual operating periods below that which may be possible or permissible. Another point is here that rather large periods of impossible periods (such as the pauses shown in FIGURE 5a) have the same restrictive effect as large overlapping-possible and therefore forbidden periods Y as shown in FIGURE 5j.

Somewhat different possibilities arise if the overlapping of possible operating periods or the impossible operating periods for solenoid-plunger operation are rather small as respectively shown representatively in FIGURES 5l and 5m, resulting in either case in large periods into which one can "place" permissible operating periods. Again, of course, the restrictive method by pin-scanning (i.e., signal formation as shown in 5f) can be chosen. If the periods of possible operation are rather large, the inversion of the signals of FIGURE 5f can be used. The detector 60 in FIGURE 6 must then be somewhat displaced relative to detector 65, and the periods where light reaches detector 60 are then the actual operating periods. AA, BB, CC, etc., these correspond now to the periods X' in FIGURE 5f as far as duration is concerned, the phase, however, is different.

The pauses or excluded periods X" correspond to the periods of signals A', B', C', etc., in case the darkening of detector 60 by the pins 42 controls the operating periods as was explained above with reference to FIGURE 6. The modification presently contemplated thus involves simply a polarity change of the output of Schmitt trigger 62 (now "false" when detector 60 goes light) and a displacement of detector 60 relative to detector 65 so that now the falling edges of signals AA, BB, CC, etc., line up with the slat selection changeover lines. By comparing FIGURE 5n with FIGURES 5l and 5m, one can see that the rule is observed that the end of an actual operating period still falls into the period of respective possible plunger operation. The beginning of the actual operating period for the respective next slat occurs after the possible period of plunger operation for the same slat has ended (FIGURES 5*l*–5*n*) or just after the period of possible plunger operation for the next slat has just begun (FIGURES 5*m*–5*n*).

The embodiment shown in FIGURE 8 realizes similar operating characteristics in a somewhat different manner. The geometry of the plunger-slat interaction has been chosen so that the gap between the slats themselves can be used to meter the forbidden operating period. The detector 60 in this case is positioned to go light at the instant of a selection changeover. The detector 60 stays light, i.e., the output of the Schmitt trigger 62 stays true for the period sufficiently long so that at the end of that period falls into a period where pushing is possible and permissible. Within the limits set by the curves of FIGURES 5*l* and 5*m* the plunger can be a broad one (FIGURE 5*l*) or a narrow one (5*m*). Otherwise the control is as has been outlined with reference to FIGURE 6.

The construction shown in FIGURE 9 permits omission of the solenoid operated plunger (FIGURE 1) and/or of the guide pins so that conveniently the slat ejection control may be as shown in FIGURE 8. In lieu of the solenoid-plunger arrangement there is provided an electromagnet 501 having a coil 502 and a core 503 and being positioned so that the exposed upper surfaces of the slats 40 pass closely underneath the downwardly directed end of core 503. Instead of pushing a slat, a strong current pulse flows through coil 502 controlled in the same manner described above with reference to control of solenoid 50. The resulting magnetization of core 503 causes a spot in the seat when underneath the core to be magnetized. The slat may be made of permanently magnetizable material, or may have an insert which is so magnetizable.

As an undisplaced but magnetized slat continues to travel in the endless belt, the magnetized area soon passes underneath an element 551, which may have essentially the same overall configuration as had rail 55 in FIGURE 1 and is made of magnetizable material. However, guide element 551 does not have the wedge. Element 551 may be a permanent magnet or may be continuously magnetized through a coil. The magnetiaztion of element 551 along its extension may be such that the downwardly directed surface is magnetized oppositely to the surface magetization of the slat. Element 551 thus attracts the magnetized area of the slat without, however, lifing it out of the chute. Instead the curved element 551 forces the magnetized spot of the slat to follow the curvature, causing the slat to move in the chute towards the conveyor belt. Curved element 551 may provide the entire motion to the slat necessary to perform an ejection. Element 551 may, furthermore, curve back to retract the slat to its normal position thereafter.

Alternatively, element 551 may provide only the initial displacement. Rails 55 and 57 and wedge 53 are then provided as shown in FIGURE 1, and the slats must have pins or the like for engagement with the rails. In either case, demagnetizing means are provided at some convenient place along the conveyor belt to erase the magnetization of the slat, or to provide oppositely oriented magnetization so that the slat would not be attacked by the element 551 during the next passage cycle, unless, of course, remagnetized again by electromagnet 501. One can see that the considerations above covering periods of possible slat-plunger interaction are analogously applicable to slat-electromagnet interactions. The electromagnet 501 could be a permanent magnet, normally held in raised position, but lowered briefly when needed to provide magnetization to a slat.

It may be desirable, as was mentioned above, to distinguish among several reject situations rather than merely between reject and not reject situations. For example, overfill and underfill of containers are both reject situations but require different remedies. As schematically shown in FIGURE 10, two different displacement devices 50*a* and 50*b* are provided along the endless belt, cooperating with two different guide rails 55*a* and 55*b*. The slats are so long that when projecting farthest by operation of rail 55*a*, a container has thus been pushed from conveyor 11, over conveyor 12 and to a third conveyor 121. Upon energization of the other displacement device, 50*b*, a rail 55*b* provides about half of the total possible displacement of a slat so that a container will be pushed from conveyor 11 onto conveyor 12 but not farther. Displacement device 50*a*, for example, is energized upon detection of an overfill, and conveyor 121 transports containers to a conveyor 11 onto conveyor 12 but not farther. Displacement device 50*b* is energized upon detection of an underfill and conveyor 12 transports the containers on it to a station adding content to each container.

What is claimed is:

1. Apparatus for removing individual objects from a conveyor line which is movable in a particular direction and on which are disposed the individual objects, including:

a plurality of ejecting means assembled to form an endless belt movable in the particular direction, each ejecting means in the plurality being individually movable in a direction which is transverse to the particular direction, each member having a front face for engaging the objects to remove the objects from the conveyor line, each ejecting means being disposed relative to the objects on the conveyor line to provide for an engagement of the objects by the front faces of the ejecting means upon a movement of the ejecting means in the transverse direction;

means for imparting movement to the endless belt in the particular direction in synchronism with the movement of the objects on the conveyor line;

displacing means for displacing individual ones of the ejecting means in the transverse direction;

guiding means operative upon each one of the displaced ejecting means for guiding the movement of each displaced ejecting means in the transverse direction to a position with the front face of the ejecting means in engagement with the individual objects for removing the individual objects from the conveyor line, and     means for selectively operating upon the displacing means in accordance with the characteristics of the objects to obtain individual displacemnet of the ejecting means.

2. Apparatus for removing individual objects from a conveyor line which is movable in a particular direction and on which are disposed the individual objects, including:

a plurality of ejecting means assembled to form an endless belt movable in the particular direction, each ejecting means in the plurality being individually movable in a direction which is transverse to the particular direction, each member having a front face for engaging the objects to remove the objects from the conveyor line, each ejecting means being disposed relative to the objects on the conveyor line to provide for an engagement of the objects by the front faces of the ejecting means upon a movement of the ejecting means in the transverse direction;

means for imparting movement to the endless belt in the particular direction in synchronism with the movement of the objects on the conveyor line;

displacing means for displacing individual ones of the ejecting means in the transverse direction; and     guiding means operative upon each one of the displaced ejecting means for guiding movement of each displaced ejecting means in the transverse direction to a position with the front face of the ejecting means in engagement with the individual objects for removing the individual objects from the conveyor line, the displacing means including first and second independently operable displacing means, the guiding means including first and second guiding means disposed to provide guided movement to the ejecting means of the plurality as respectively displaced by the first and second displacing means and towards different directions.

3. Apparatus for removing individual objects from a conveyor line which is movable in a particular direction and on which are disposed the individual objects, including:

- a plurality of ejecting means assembled to form an endless belt movable in the particular direction, each ejecting means being individually movable in a direction which is transverse to the particular direction of movement of the belt, each ejecting means having a front face for engaging the individual objects, each ejecting means being disposed relative to the conveyor line to provide for a displacement of the ejecting means in the transverse direction and provide for a displacement of the individual objects from the conveyor line upon the displacement of the ejecting means in the transverse direction;
- means for imparting movement to the endless belt in the particular direction at a speed related to the movement of the conveyor line in the particular direction;
- displacing means for displacing individual ones of the ejecting means in the transverse direction; and
- means for selectively operating upon the displacing means in accordance with the characteristics of the objects to obtain individual displacements of the ejecting means in the plurality.

4. Apparatus for removing individual objects from a conveyor line which is movable in a particular direction and on which are disposed the individual objects, including:

- a plurality of ejecting means assembled to form an endless belt movable in the particular direction, each ejecting means being individually movable in a direction which is transverse to the particular direction of movement of the belt, each ejecting means having a front face for engaging the individual objects, each ejecting means being disposed relative to the conveyor line to provide for a displacement of the ejecting means in the transverse direction and provide for a displacement of the individual objects from the conveyor line upon the displacement of the ejecting means in the transverse direction;
- means for imparting movement to the endless belt in the particular direction at a speed related to the movement of the conveyor line in the particular direction;
- displacing means for displacing individual ones of the ejecting means in the transverse direction;
- means for selectively operating upon the displacing means in accordance with the characteristics of the objects to obtain individual displacements of the ejecting means in the plurality;
- detecting means positioned in relation to the conveyor line for monitoring the passage of the individual objects on the conveyor line and providing a signal representative of the passage of a particular portion of each such object; and
- means for obtaining a controlled operation of the displacing means in response to the signal from the detecting means to respectively displace a particular one of the ejecting means for obtaining a subsequent engagement of the object by the particular ejecting means at the particular portion.

5. Apparatus as set forth in claim 4 including means for delaying the signal by a particular period of time before obtaining the controlled operation of the displacing means.

6. Apparatus as set forth in claim 4 and comprising second detecting means positioned relative to the ejecting means in the plurality to provide a periodic sequence of signals representative of the passage of individual ejecting means in the plurality past the displacing means to respectively restrict operative effectiveness of the signal from the first detecting means to particular periods corresponding to the movements of the individual objects past particular positions on the conveyor line.

7. Apparatus for removing individual objects from a conveyor line which is movable in a particular direction and on which are disposed the individual objects, including:

- means for providing a plurality of slats in a relationship to define a belt;
- means for providing a movement of the slats in a particular direction;
- means for providing a controlled displacement of individual slats in the plurality in a direction transverse to the particular direction to obtain a removal of individual objects from the conveyor line;
- means responsive to the passage of a particular portion of each individual object through a position of reference to produce a control signal in accordance with individual characteristics of the object;
- circuit means for providing an alternating sequence of enabling and disabling signals with each enabling signal providing for a displacement of each individual slot in the plurality in the transverse direction and with each disabling signal preventing displacement of each such individual slat in the plurality; and
- means responsive to the production of the control signal during the production of one of the enabling signals to obtain a displacement of an individual one of the slats in the transverse direction during the production of that enabling signal.

8. Apparatus as set forth in claim 7 including stationary detection means to derive the alternating sequence of enabling and disabling signals from the passage of the slats in the particular direction past the detection means.

9. Apparatus for removing individual objects from a conveyor line which is movable in a particular direction and on which are disposed the individual objects, including:

- a plurality of slats individually movable in the particular direction and displaceable in a second direction transverse to the particular direction to remove the individual objects from the conveyor line in accordance with the characteristics of such object;
- means for providing a movement of the slats in the particular direction;
- a slat actuator positioned for displacing each slat in the transverse direction, the slat actuator being constructed to displace individual slats in the transverse direction during particular periods of time;
- means for providing control signals to obtain the displacement of individual slats in the transverse direction;
- means for providing a sequence of discrete enabling signals during the particular period when the actuator is properly positioned relative to the indiivdual slats to displace the individual slats in the transverse direction; and
- means responsive to the control signals and to the enabling signals for obtaining a controlled operation of the actuator to obtain the displacement of individual slats in the transverse direction when a control signal and an enabling signal simultaneously occur.

10. Apparatus for removing individual objects from a conveyor line which is movable in a particular direction and on which are disposed the individual objects, including:

- a plurality of slats individually movable in the particular direction and displaceable in a second direction transverse to the particular direction to remove the individual objects from the conveyor line in accordance with the characteristics of such object;

means for providing a movement of the slats in the particular direction;

a slat actuator positioned for displacing each slat in the transverse direction, the slat actuator being constructed to displace individual slats in the transverse direction during particular periods of time;

means for providing control signals to obtaining the displacement of individual slats in the transverse direction;

means for providing a sequence of discrete enabling signals during the particular period when the actuator is properly positioned relative to the individual slats to displace the individual slats in the transverse direction; and means responsive to the control signals and to the enabling signals for obtaining a controlled operation of the actuator to obtain the displacement of individual slats in the transverse direction when a control signal and an enabling signal simultaneously occur;

the slats being disposed relative to the individual objects to face the individual objects at one end and overlapping each other at the ends facing the individual objects; and means responsive to the control and enabling signals for selecting the particular one of the overlapping slats in position for directly engaging the individual objects to remove the individual objects from the conveyor line.

11. Apparatus for removing individual objects from a conveyor line which is movable in a particular direction and on which are disposed the individual objects, including:

a plurality of substantially parallel channels mounted to form an endless belt defining a particular plane in at least a portion of its endless configuration, the channel being substantially parallel in a direction transverse to the particular direction;

means for imparting motion to the endless belt in the particular direction;

a plurailty of ejecting means each respectively disposed in an individual one of the channels and being movably disposed in its channel for displacement in the transverse direction, each ejecting means in the plurality having a cam surface capable of displacing the ejecting means between extended and retracted positions such that the ejecting means removes an individual object from the conveyor line during movement from the retracted position to the extended position;

means for operating upon individual ones of the ejecting means in the plurality to provide for a displacement of such ejecting means from the retracted position toward the extended position; and guiding means positioned to engage the cam surface of each ejecting means operated upon by the last mentioned means to cause subsequent displacement of the ejecting means to the extended position and then to the retracted position during the movement of the ejecting means to a second particular position in the particular direction.

12. Apparatus for removing individual objects from a conveyor line which is movable in a particular direction and on which are disposed the individual objects, including:

a plurality of ejecting means each having a front surface facing the individual objects, the ejecting means in the plurality being assembled to form an endless belt movable in the particular direction, the ejecting means in the plurality being disposed relative to each other to be individually movable in a direction transverse to the particular direction;

first means for moving the endless belt in the particular direction;

second means for providing to the ejecting means in the plurality an individual displacement of the ejecting means in the transverse direction;

third means responsive to the movement of the endless belt in the particular direction for providing a signal train constituting a plurality of spaced signals and representative of sequential periods for obtaiing displacement of individual ejecting means in the plurality in the transverse direction;

fourth means for providing a selection signal representative of the position of individual objects on the conveyor line in relation to the front surfaces of the individual ejecting means in the plurality; and fifth means for obtaining a controlled operation of the second means in response to concurrence of the selection signal and of a signal of the signal train.

13. The apparatus set forth in claim 12, including:

sixth means for obtaining a controlled operation of the second means on a delayed basis upon the production of the selection signal in the period between a pair of the spaced signals in the signal train.

14. Apparatus for removing individual objects from a conveyor line which is movable in a particular direction and on which are disposed the individual objects, including:

a plurality of ejecting means mounted in an endless belt for movement in unison in the particular direction along a portion of the path of the conveyor line, the individual ejecting means in the plurality being individually displaceable in a transverse direction relative to the particular direction, each of the ejecting means in the plurality having a front face for movement relative to the conveyor line to engage the individual objects on the conveyor line and remove the individual objects from the conveyor line, the front face of each ejecting means in the plurality having a configuration to overlap the front faces of adjacent ejecting means in the plurality;

means for providing displacement of the individual ejecting means in the plurality in the transverse direction during movement of the ejecting means along the conveyor line to obtain an engagement of the individual objects on the conveyor line by the front faces of the individual ejecting means; and means for triggering the displacement of the individual ejecting means in the transverse direction when the members are in position to provide such displacement of the objects on the conveyor line to the exclusion of any such displacement of the adjacent member; and means for inhibiting the displacement of the individual ejecting means in the transverse direction when the front faces of the individual ejecting means would engage the objects in a particular portion of such objects to inhibit proper removal of such objects from the conveyor line.

15. Apparatus for removing individual objects from a conveyor line which is movable in a particular direction and on which are disposed the individual objects, including:

a plurality of ejecting means each having a cam surface, an operating front face and an axis transversely disposed to the particular direction;

first means for positioning the ejecting means in parallel relationship to one another, each ejecting means being movably disposed in the positioning means for displacement of the ejecting means along its axis, each ejecting means being disposed in the positioning means to become displaced along the transverse axis to a protracted position and a retracted position in relation to the positioning means, the positioning means defining an endless belt;

second means for driving the belt in the particular direction;

third means for selecting individual ones of the ejecting means to obtain displacements of such ejecting means between the retracted and protracted positions; and fourth means positioned for cooperating with the selected ejecting means for progressively causing protraction of the ejecting means to the protracted position and subsequent retraction of the ejecting means to the retracted position during the movement of the ejecting means in the particular direction.

16. Apparatus as set forth in claim 15 wherein the fourth means include control means disposed for selective operation upon the individual ejecting means to displace the ejecting means to a position for progressive protraction by the fourth means and wherein the third means selectively operates the control means.

17. Apparatus as set forth in claim 15, the fourth means including means disposed for selectively magnetizing the individual ejecting means and including means responsive to magnetization of a magnetized ejecting means of the plurality to at least initiate protraction of the latter ejecting means.

18. Apparatus for removing individual objects from a conveyor line which is movable in a particular direction and on which are disposed the individual objects, including:

a plurality of ejecting means each having a cam surface, an operating front face and an axis transversely disposed to the particular direction;

first means for positioning the ejecting means in parallel relationship to one another, each ejecting means being movably disposed in the positioning means for displacement of the ejecting means along its axis, each ejecting means being disposed in the positioning means to become displaced along the transverse axis to a protracted position and a retracted position in relation to the positioning means, the positioning means defining an endless belt;

second means for driving the belt in the particular direction;

third means for selecting individual ones of the ejecting means to obtain displacements of such ejecting means between the retracted and protracted positions;

fourth means positioned for cooperating with the selected ejecting means for progressively causing protraction of the ejecting means to the protracted position and subsequent retraction of the ejecting means to the retracted position during the movement of the ejecting means in the particular direction;

the front faces of the ejecting means have overlapping configurations; and means for selecting a particular one of the ejecting means in accordance with the disposition of the individual objects in the particular direction relative to the overlapping front faces of the ejecting means to obtain displacement of the selected ejecting means in the transverse direction.

19. Apparatus as set forth in claim 18 the control means including means for providing a first signal representative of the relative position of a particular position on the object where the front face of more than one of the ejecting means could engage the object;

means for providing a train of enabling and disabling signals on an alternating basis and for providing a changeover from an enabling signal to a disabling signal when displacement of an ejecting means displaceable during a period of any enabling signal is to be inhibited; and means responsive to the first signal and to the train of enabling and disabling signals to control the operation of the displacing means in response to an enabling signal and in further response to occurrence of a first signal during an enabling signal or the respectively disabling signal.

20. Apparatus as set forth in claim 18, wherein the control means includes means for providing a signal representative of the relative position of an object to the front faces of the ejecting means; and means responsive to the signal from the control means and to the progressive motion of the ejecting means in the particular direction to provide for an operative control of a particular ejecting means when the signal from the control means indicates that the front face of the ejecting means will engage a particular position on the object in the particular direction.

21. A device as set forth in claim 18 wherein the control means includes means for providing signals representative of the position of at least the particular position on the object to be engaged by the front face of the particular ejecting means in relation to the front faces of the adjacent ejecting means; and means for providing for each of the ejecting means a short period of permissible operation of the displacing means for the displacing of the ejecting means in the transverse direction when a signal occurs in one of the short periods or in the preceding period succeeding the short period associated with the respectively succeeding ejecting means.

22. Apparatus for removing individual objects from a conveyor line which is movable in a particular direction and on which are disposed the particular objects, including:

a plurality of ejecting means each an operating front face and an axis transversely disposed to the particular direction;

first means for positoning the ejecting means in the plurality in parallel relationship to each other, each ejecting means being movably disposed in the positioning means for displacement of the ejecting means along its axis, each ejecting means being disposed in the positioning means to assume a protracted position and a retracted position in the transverse direction in relation to the positioning means, the displacement of each slat occurring between the retracted and protracted positons, the positioning means defining an endless belt;

second means for driving the belt in the particular direction;

third means for initially operating upon the individual ejecting means in the plurality to provide for a displacement of such ejecting means from the retracted position toward the protracted position; and fourth means responsive to the operation upon the individual ejecting means by the third means for progressively causing protraction of the slats to the protracted position and subsequent retraction of the slats to the retracted positon during the movement of the slats in the particular direction.

23. Apparatus as set forth in claim 22 including means responsive to a particular relationship between the individual objects and the front faces of the ejecting means to produce a control signal representative of such particular relationship; and means for introducing the control signal to the displacing means for operation of the displacing means.

24. Apparatus as set forth in claim 22 wherein each ejecting means in the plurality is provided with a projecting pin defining a cam surface cooperating with the third means.

25. Apparatus as set forth in claim 24 including control means for monitoring the passage of the pins during motion of the belt to provide for control signals of limited duration for operating the means for displacing.

26. Apparatus as set forth in claim 24 wherein the control means includes means responsive to the position of an object to be engaged relative of the front faces of the ejecting means for controlling the operation of the displacing means so that a particular ejecting means is displaced for engaging the object at a particular position on the object.

27. Apparatus as set forth in claim 22, wherein each of the ejecting means has a cam surface, the third means being a solenoid with plunger and including means controlling the solenoid for opearting the plunger to obtain the displacement of the ejecting means.

28. Apparatus as set forth in claim 22, wherein each ejecting means has at least one magnetizable area, the third means including means operable for magnetizing the area of an ejecting means of the plurality;

the third and fourth means including magnetic means to obtain at least an initial displacement of a magnetized ejecting means by magnetic interaction between the magnetic means and the magnetized area of the ejecting means of the plurality.

29. Apparatus for moving individual objects from a first conveyor line which is movable in a particular direction and on which are disposed the individual objects, to one of a plurality of second conveyor lines arranged in side by side relation to the first conveyor line and moving in synchronism therewith, including:

a plurality of ejecting means assembled to form an endless belt movable in the particular direction, each ejecting means being individually movable in a direction which is transverse to the particular direction of movement of the belt, each ejecting means having a front face for engaging the individual objects, each ejecting means being disposed relative to the conveyor line to provide for a displacement of the ejecting means in the transverse direction, the members being disposed relative to the first conveyor line to provide for a displacement of the individual objects from the first conveyor line upon the displacement of the ejecting means in the transverse direction;

means for imparting movement to the endless belt in the particular direction at a speed related to the movement of the conveyor line in the particular direction, the endless belt moving in synchronism with the first conveyor line;

a plurality of displacing means for initially displacing individual ones of the ejecting means in the transverse direction;

means for selectively operating upon the displacing means of the plurality in accordance with the characteristics of the objects to obtain individual displacements of the ejecting means in the plurality; and guide means positioned in relation to the displacing means of the plurality to control the extent of further displacement of an ejecting means of the plurality having been initially displaced by a displacing means of the plurality, so that a container engaged by the displaced ejecting means is removed from the first conveyor onto one conveyor of the plurality of second conveyors.

30. A control circuit for controlling the selective displacement of a plurality of slats, the slats being disposed for movement in particular direction and individually displaceable transverse to the particular direction, there being means for providing individual displacement of slats, comprising:

first means for providing control signals independent from motion of the slat in the particular direction;

second means coupled to the slats for providing an alternating sequence of enabling and disabling signals in synchronism with motion of the slats in the particular direction with each enabling signal terminating when the displacement selection of a slat displaceable during the enabling signal terminates; and third means connected to the first means to be responsive to the production of one of the control signals during the production of one of the disabling signals and coupled to the means for selective displacement for obtaining displacement of a slat during the respectively succeeding enabling signal.

31. Apparatus for removing individual objects from a conveyor line which is movable in a particular direction and on which are disposed the individual objects, including:

a plurality of ejecting means assembled to form an endless belt movable in the particular direction, each ejecting means being individually movable in a direction which is transverse to the particular direction of movement of the belt, each ejecting means having a front face for engaging the individual objects, each ejecting means being disposed relative to the conveyor line to provide for a displacement of the ejecting means in the transverse direction and provide for a displacement of the individual objects from the conveyor line upon the displacement of the ejecting means in the transverse direction;

means for imparting movement to the endless belt in the particular direction at a speed related to the movement of the conveyor line in the particular direction;

displacing means for displacing individual ones of the ejecting means in the transverse direction;

means for selectively operating upon the displacing means in accordance with the characteristics of the objects to obtain individual displacements of the ejecting means in the plurality;

the front faces of adjacent ejecting means in the plurality overlapping in a particular relationship, and detecting means responsive to the disposition of each individual object relative to the front faces on the adjacent ejecting means in the plurality to select particular ones of the adjacent ejecting means in the plurality in accordance with such relative disposition.

References Cited

UNITED STATES PATENTS 2,936,059   5/1960   Hakogi _________ 198—22 X

ALLEN N. KNOWLES, Primary Examiner

U.S. Cl. X.R.

198—22